Dec. 23, 1952          W. A. COX          2,622,614
RATE VALVE
Filed Aug. 1, 1947
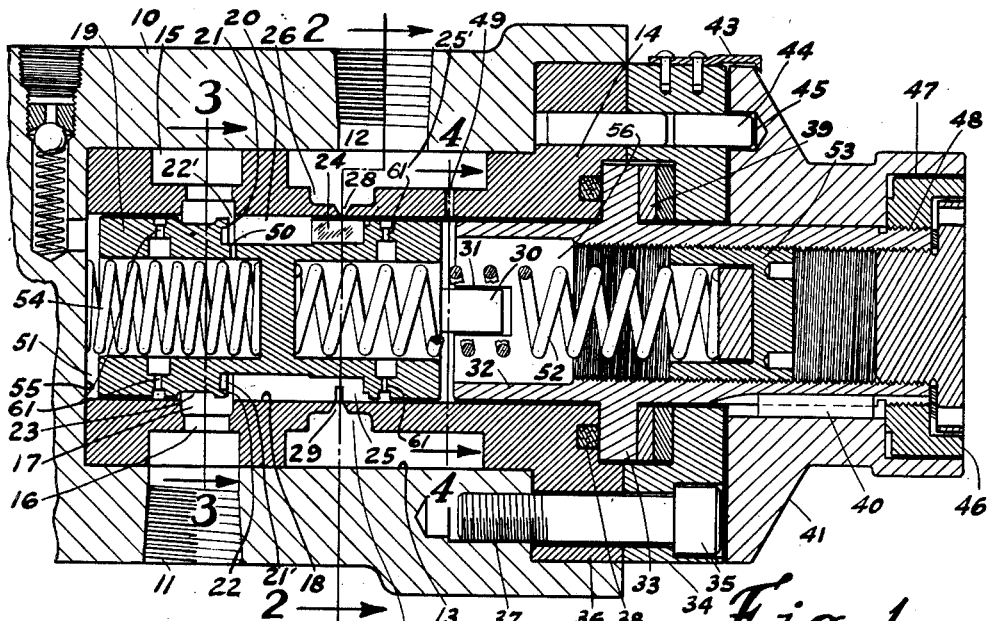
Fig. 1.
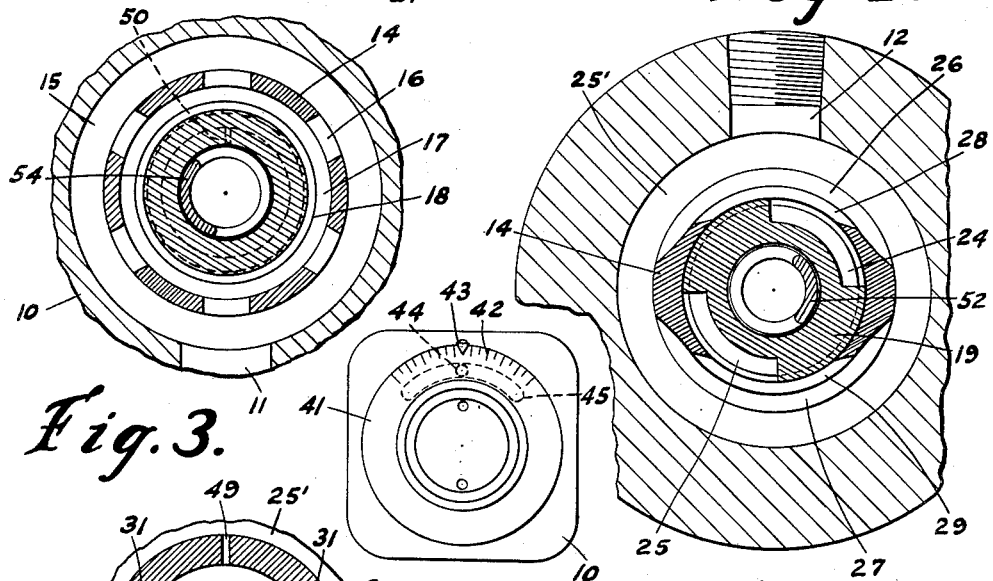
Fig. 3.      Fig. 2.
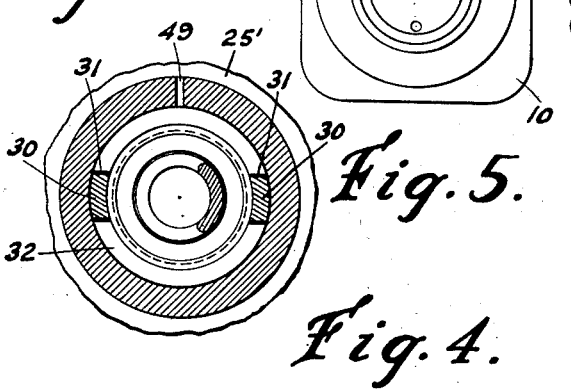
Fig. 5.
Fig. 4.
INVENTOR.
WALTER A. COX
BY
H. K. Parsons & L. W. Wright
ATTORNEYS Patented Dec. 23, 1952

2,622,614

UNITED STATES PATENT OFFICE 2,622,614

RATE VALVE

Walter A. Cox, Cincinnati, Ohio, assignor to The Cincinnati Milling Machine Co., Cincinnati, Ohio, a corporation of Ohio Application August 1, 1947, Serial No. 765,555

4 Claims. (Cl. 137—500)

This invention relates to hydraulic control devices and more particularly to those for controlling the rate of operation of hydraulically operated mechanisms.

One of the objects of this invention is to provide an improved hydraulic rate control valve.

Another object of this invention is to provide a rate control valve that will produce a constant and dependable rate of volumetric flow for effecting a constant rate of operation.

A further object of this invention is to provide a rate control valve which is presettable to produce a selected rate of operation and which is automatically adjustable in response to pressure changes of either the supply or delivery to maintain the selected rate constant.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a cross sectional view through the valve body.

Figure 2 is a section on the line 2—2 of Figure 1.

Figure 3 is a section on the line 3—3 of Figure 1.

Figure 4 is a section on the line 4—4 of Figure 1.

Figure 5 is an elevational view of the control dial.

Referring to Figure 1 of the drawings, the reference numeral 10 indicates, in general, the main body or housing of the valve in which is formed an inlet threaded bore 11 and an outlet threaded bore 12 to which suitable pipes may be connected as, for instance, a supply pipe may be connected to the bore 11 and a delivery pipe may be connected to the bore 12. Any suitable source of hydraulic fluid may be connected to the supply pipe, such as an accumulator or a suitable form of pump, whereby fluid will be delivered under pressure to the valve for control thereby of the rate of operation of a suitably connected fluid operable device. As an example, the valve may be supplied by a pump having a relief valve connected thereto, and utilized to produce and maintain a constant volumetric delivery to the fluid consuming device, but, at the same time, maintaining the volumetric delivery constant regardless of changes in the operating pressure demand.

The valve body 10 has a bore 13 in which is tightly fitted a sleeve 14. The sleeve has an annular groove 15 formed therein which registers with the inlet bore 11 and, as shown, in Figure 3, has a plurality of radial holes 16 drilled in the bottom of the groove which establish communication with an interior annular groove 17 formed in the wall of the bore 18 of the sleeve. A valve plunger 19 is slidably mounted in the sleeve bore 18 and is provided with a wide annular groove 20. The end face 21 of the annular groove 20 has an annular recess 21' formed therein which provides a narrow shoulder 22 which is movable relative to the side face of the annular groove 17 to determine a port opening through which fluid may flow from the annular groove 17 into the annular groove 20 of the valve. It is obvious that if the fluid is supplied to the valve under pressure that the port 22' will cause a pressure drop from groove 17 to groove 20, and thus the pressure of the fluid in the groove 20 is less than the pressure in the groove 17.

The other end of the valve groove 20 reduces to two arcuate grooves 24 and 25 which are diametrically opposite to one another, as shown in Figure 2, and have a circumferential extent of about 90 degrees.

The sleeve 14 has another annular groove 25' formed therein which registers with the delivery outlet 12 and in the bottom of the annular groove 25' are formed two narrower arcuate grooves 26 and 27 which are less than 180 degrees in circumferential extent, and in the bottom of these grooves there is cut V-shaped slots 28 and 29 which break through to the interior of the sleeve and form two orifices or delivery ports which are V-shaped in cross section and which have substantially a 90 degree extent circumferentially. These delivery ports are, therefore, narrow slots and the extent of opening is determined by the rotatable position of the valve plunger 19. In other words, the valve plunger may be rotated substantially 45 degrees from the position shown in Figure 2 in a counterclockwise direction to effect a full opening of the ports, or it may be rotated 45 degrees in a clockwise direction to completely close the ports. Thus the rotative position of the valve 19 determines the rate setting thereof and the volume of fluid to be delivered per unit of time.

It will be noted that the ports 28 and 29 are sharp-edged and V-shaped in cross section which tends to make these ports turbulent orifices, and a turbulent orifice tends to negate the effects of viscosity.

Rotation of the valve plunger 19 is accomplished by providing two axially extending clutch teeth 30 on the end of the valve plunger, and these project into corresponding shaped slots 31, as shown in Figure 4, formed in the end of an adjusting sleeve 32 rotatably mounted in the bore of fixed sleeve 14. The sleeve 32 has a flange 33 formed thereon which abuts against the end of the valve sleeve 14 and is held in position by a cap member 34 which, as shown in Figure 1, is secured by bolts 35 passing through both the cap member and the end flange 36 of the valve sleeve, and threaded at 37 in the valve body. A suitable seal 38 is provided between the face of the flange 33 and the end of valve sleeve 14, and suitable spacers and seals are provided at 39 on the opposite side of the flange to insure relative rotation of the flange without leakage of fluid past it. Again, the seals provide sufficient friction to prevent rotation of the part after adjustment.

The adjusting sleeve 32 has secured to it, as by a key 40, an operating dial 41 which is suitably graduated, as shown by the graduation marks 42 in Figure 5, for movement relative to a fixed indicator 43 to indicate the rotatable setting of the valve. A stop pin 44 is provided in the cap 34 to project into an arcuate groove 45 formed in the face of the dial for limiting movement thereof.

The dial 41 is held on the adjusting sleeve 32 by means of a threaded member 46 which is located in a countersunk hole 47 in the end of the dial and threaded at 48 to the end of the sleeve. It should now be obvious that the valve 19 may be rotated, without interfering with its axial movement, to determine the extent of the opening of the delivery port 28.

The pressure of the fluid in the delivery line and thus in the annular groove 25' of the valve sleeve 14 is determined by the load requirements of the device to be operated, and if the load requirements vary during the operation of the device it is obvious that the operating pressure will vary. This is a common condition in the operation of many fluid operable devices and is the cause for variation in the rate of operation. The volumetric flow through the outlet port is determined generally from the formula that the pressure drop across the port is equal to the product of the volume and the resistance. It, therefore, follows that the pressure in the annular groove 20 required to force a given volume through the resistance of the outgoing port depends upon the pressure required to operate the load, or in other words, the pressure at the outlet 12. If the pressure in the groove 20 is constant and the pressure in the groove 25' varies, then the volume of fluid will vary and thus the rate of operation of the actuated device will vary accordingly.

By means of this invention the volume of flow is maintained constant regardless of changes in the pressure required to operate the load. It will be noticed that the arcuate grooves 24 and 25 in the valve plunger are made of considerable axial length whereby the valve plunger may be axially moved relative to the outlet ports without changing the area of the opening of the ports, and therefore the physical dimension of the port opening does not change when the valve plunger is moved axially and therefore the port has a fixed resistance to the flow of fluid therethrough for any axial position of the valve plunger.

A different situation exists, however, at the inlet port 22' in that any axial movement of the valve plunger will change the physical dimension of the opening of this port and thereby change the value of its resistance to fluid flow accompanied by a change in pressure drop across this port. We have, therefore, a hydraulic circuit in which is serially arranged a first hydraulic resistance, port 22', which is of a variable character, a space or chamber such as the annular groove 20 in the valve plunger, and a second resistance, port 28, which is a fixed resistance. Since the second resistance is a fixed resistance and since it is desired that the volumetric flow through this resistance remain a constant, it follows from the above formula that the pressure drop or, in other words, the difference in pressure between that in groove 20 and that in groove 25' must remain constant. In other words, if there is a rise in pressure in the groove 25' due to load conditions there must be a corresponding rise in the pressure in the groove 20 to maintain the difference between them constant, and similarly if there is a drop in pressure in the groove 25' there must be a corresponding drop in pressure in the groove 20. Compensation for these changes is accomplished automatically in the following manner.

The valve sleeve 14 is provided with a port 49, shown in Figure 4, and it serves as a connection between the annular groove 25' and the space 56 between the end of the valve plunger and the adjustable sleeve 32. Therefore, by means of this connection what ever pressure exists in the annular groove 25', substantially the same pressure acts on the end of the valve plunger to shift the same toward the left. In addition, the annular groove 20 in the valve plunger is connected by a port 50 to the space 51 between the end of the plunger and the end wall 55 so that whatever pressure exists in the groove 20 also acts on the left end of the valve plunger to shift the same toward the right.

Thus, the difference between the pressure acting in the space 51 and the pressure acting in the groove 25' will be equal to the pressure drop across the port 28. Therefore, in order to balance the opposing forces acting on the valve plunger, a spring 52 is interposed between the end of the valve plunger and a plug 53 which is threaded in the interior bore of the adjusting sleeve 32. The plug 53 may be rotated to adjust the tension of spring 52 and the tension of the spring determines the equilibrium pressure drop across the port 28 and the value of this pressure drop, together with the extent of opening of port 28, determines the rate of operation of the device. With the port 28 fully open, adjustment of the spring will determine an upper limit for the rate of flow and thus the rate of operation of the load. The valve plunger may now be rotated to restrict the opening of port 28 and reduce this rate whereby any specific rate between said upper limit and zero rate may be selected. Thus the spring is utilized to determine the range of operation and the valve is utilized to select a specific rate within that range.

As further explanation of the operation, it may be said that the spring determines the intermediate pressure in groove 20 which, of course, must be sufficiently high to produce the desired drop in pressure. Since the pressure acting on the end of the valve opposing the spring pressure is the intermediate pressure, and the intermediate pressure is the pump pressure reduced by the pressure drop across the inlet port, it will be obvious that the valve plunger by automatically shifting under the spring pressure will effect such opening of the inlet port as will produce an intermediate pressure which will balance the spring pressure plus the pressure in the delivery line and by so doing will automatically stop further opening of the inlet port.

Similarly, a drop in pressure in the groove 25' caused by a decrease in load condition will cause a pressure reduction on the right hand end of the valve plunger whereby the plunger will shift to the right. This shifting movement will decrease the opening of the port 22', increasing the resistance thereof, thus increasing the pressure drop across the port and, thereby reducing the pressure in the groove 20 to keep the pressure drop across the port constant. This reduced pressure in groove 20 will be communicated to the space 51 to balance the pressure in the opposite end of the valve plunger and hold the valve in its new position.

This valve is not only responsive to pressure variations in the delivery line to effect adjustments to maintain the pressure drop constant across the delivery, but is also effective to make adjustments if the supply pressure should vary while all the other conditions remain constant.

Assuming, therefore, that the delivery pressure is constant, a pressure rise at the inlet 15, will cause a pressure rise in the valve groove 20. This will producee a change in the pressure drop across the port 29 and an increase in flow therethrough. The resulting rise in pressure in the groove 20 will, however, be communicated through port 50 to chamber 51 which will cause the valve plunger to shift to the right, thereby increasing resistance of port 22' without changing the resistance of the outlet port, thereby restoring the original pressure in groove 20 to keep the pressure drop across port 29 constant. A decrease in the supply pressure will cause a reduction in pressure in chamber 51, whereby the valve plunger will shift to the left to decrease the resistance of the inlet port without changing the resistance of the outlet port.

Attention is invited to the fact that the ports 49 and 50 are of such size as to restrict the rate of flow therethrough to a prescribed rate which prevents sudden fast movements of the plunger upon change in pressure conditions so that the plunger shifts at a modified rate without overtravel, thereby preventing oscillation. If so desired, a light spring 54 may be inserted in the space 51 when the valve is mounted in a vertical position to partially counterbalance the weight of the piston 19.

To facilitate movement of the valve plunger 19, it may be provided with a plurality of radial ports 61 as shown in Figure 1 whereby the pressure fluid in the end chambers may be utilized to lubricate the bore in which the valve plunger slides.

There has thus been provided an improved rate valve for the purposes described which is efficient in operation for maintaining the rate of operation of a hydraulically actuated device constant regardless of load changes on the device which would cause pressure fluctuations in the pressure supply line to the device and thereby vary its rate of operation.

What is claimed is:

1. A rate valve comprising a housing having a bore therein, a valve sleeve mounted in said bore and having inlet and outlet ports formed therein, a valve member slidably mounted in said sleeve and having an annular chamber interconnecting said ports, resistance means on the valve member at one end of said chamber adjacent said inlet port for reducing the pressure of the incoming fluid to said chamber to an intermediate pressure, said valve member having means conducting said intermediate pressure for reaction on one end of said valve member to increase the throttling action at said inlet port, additional resistance means formed on the valve member at the other end of said chamber and adjacent said outlet port for reducing said intermediate pressure to a final pressure on the downstream side of said outlet port, means in said sleeve conducting said final fluid pressure for reaction on the other end of said valve member to decrease the throttling action at said inlet port, and spring means of a force equal to the pressure drop desired across said outlet port for biasing said valve member in a direction to open said inlet port.

2. A rate valve comprising a housing having a bore therein, a valve sleeve mounted in said bore and having inlet and outlet ports formed therein, a valve member slidably mounted in said sleeve and having an annular chamber interconnecting said ports, resistance means on the valve member at one end of said chamber adjacent said inlet port for reducing the pressure of the incoming fluid to said chamber to an intermediate pressure, said valve member having means conducting said intermediate pressure for reaction on one end of said valve member to increase the throttling action at said inlet port, additional resistance means formed on the valve member at the other end of said chamber and adjacent said outlet port for reducing said intermediate pressure to a final pressure on the downstream side of said outlet port, means in said sleeve conducting said final fluid pressure for reaction on the other end of said valve member to decrease the throttling action at said inlet port, spring means of a force equal to the pressure drop desired across said outlet port for biasing said valve member in a direction to open said inlet port, and means to adjust the biasing force of said spring means to establish a new pressure drop condition across the outlet port.

3. A rate valve comprising a housing having a bore formed therein, a valve sleeve mounted in said bore having an inlet and an outlet port formed therein, a valve member mounted in said sleeve for rotary and axial movement to control the flow between said ports, said outlet port comprising a cross slot of V-shaped cross section and of predetermined angular extent, a recess formed in the valve member of greater width than said slot but of the same angular extent and responsive to rotary movement only of the valve member to variably open said cross slot, means operatively connected to said valve member including an indicator dial to effect rotary adjustment of said valve member and thereby determine the effective opening of said outlet port, means on the valve member adjacent said inlet port and responsive only to axial movement of the valve member to control the pressure drop of the incoming fluid to said recess, means biasing the valve member in an axial direction to decrease said pressure drop at the inlet port, and means to connect the pressure on the upstream and downstream sides of said outlet port to opposite ends of the valve member to axially balance the valve member.

4. A rate valve comprising a housing having a bore formed therein, a sleeve mounted in said bore having inlet and outlet ports formed therein, a valve member mounted in the sleeve for rotary and axial movement, said member having an intermediate annular chamber formed therein terminating adjacent said inlet and outlet ports, resistance means on said valve member adjacent one end of said chamber for variably throttling the flow through said inlet port to said chamber in response to axial movement only of said valve member, other resistance means on said valve member adjacent the other end of said chamber and said outlet port for response to rotary movement only of the valve member for varying the size of opening of said outlet port, spring means to bias the valve axially in a direction to open said inlet port, means connecting the pressure in said chamber for reaction on one end of said valve member in opposition to said spring, and means connecting the pressure on the downstream side of said outlet port for reaction on the other end of said valve member.

WALTER A. COX.

REFERENCES CITED

The following references are of record in the file of this patent:

UNITED STATES PATENTS

| Number | Name | Date |
|---|---|---|
| 1,907,162 | Webb | May 2, 1933 |
| 1,933,852 | Hahn | Nov. 7, 1933 |
| 2,059,364 | Kimball | Nov. 3, 1936 |
| 2,139,050 | Vickers | Dec. 6, 1938 |
| 2,167,837 | Hall | Aug. 1, 1939 |
| 2,484,916 | Tucker | Oct. 18, 1949 |